R. T. DANIEL.
HUB ATTACHING DEVICE.
APPLICATION FILED JUNE 4, 1908.
915,831.
Patented Mar. 23, 1909.
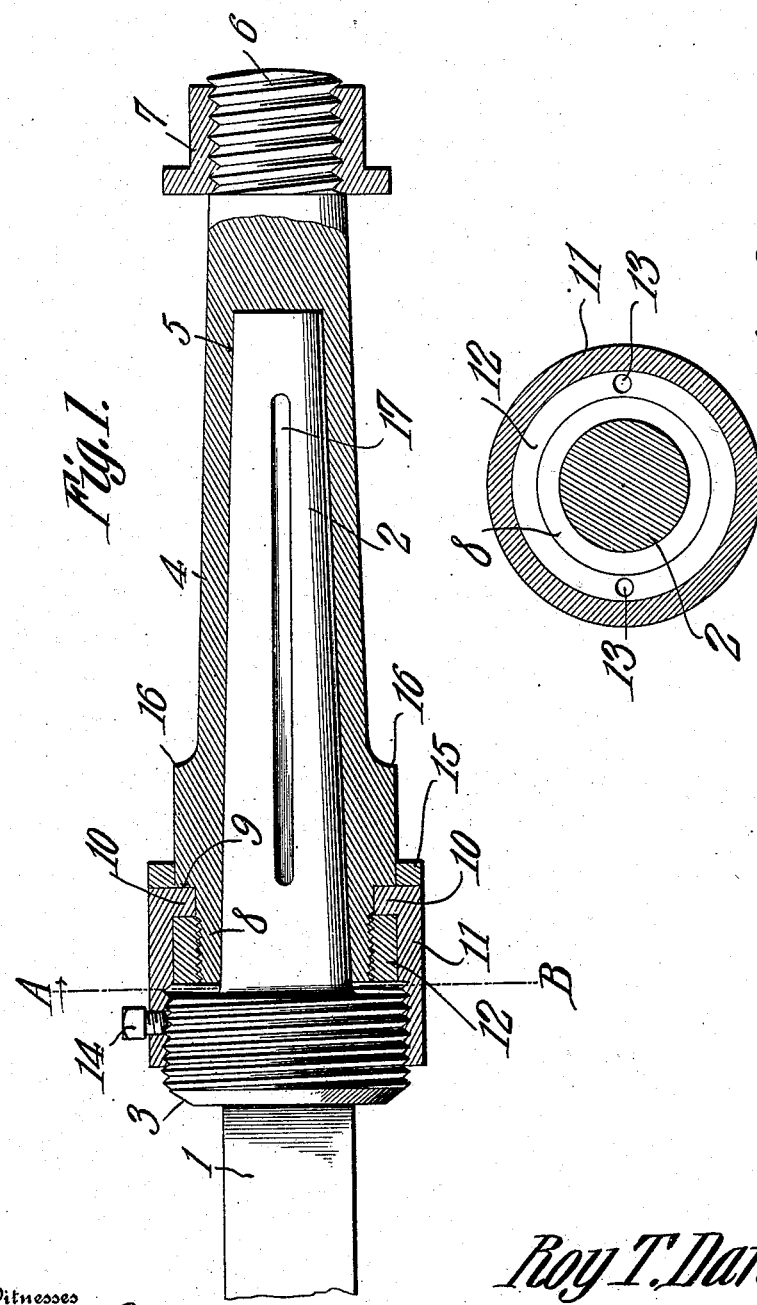

UNITED STATES PATENT OFFICE.

ROY T. DANIEL, OF LYNCHBURG, VIRGINIA.

HUB-ATTACHING DEVICE.

No. 915,831. Specification of Letters Patent. Patented March 23, 1909.

Application filed June 4, 1908. Serial No. 436,671.

*To all whom it may concern:*

Be it known that I, ROY T. DANIEL, a citizen of the United States, residing at Lynchburg, in the county of Campbell and State of Virginia, have invented a new and useful Hub-Attaching Device, of which the following is a specification.

This invention relates to vehicle axles and more particularly to means for holding wheels thereon.

The object of the invention is to provide simple and efficient means coöperating with the axle and engaging the box of the wheel whereby displacement of said wheel relative to the axle is prevented.

Another object is to provide durable and compact means of this character, said means being dustproof and having its parts so constructed and arranged as to be quickly assembled or taken apart.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a longitudinal section through the improvements constituting the present invention. Fig. 2 is a section on line A—B, Fig. 1.

Referring to the figures by characters of reference, 1 designates an axle having a tapered spindle 2 extending therefrom, said spindle projecting beyond a collar 3 formed upon the axle and provided with exterior screw threads.

The axle box of a wheel hub is indicated at 4, said box being provided with an elongated tapered recess 5 arranged longitudinally therein and designed to receive the spindle 2. The box 4 is preferably tapered toward its outer end where a screw threaded stem 6 is located, said stem being designed to be engaged by a nut 7 for the purpose of holding the box 4 within the hub of a wheel. That end of the box 4 farthest removed from stem 6 is reduced annularly and threaded as shown at 8 so as to form an annular shoulder 9. This shoulder constitutes an abutment for an inwardly directed annular flange 10 formed at one end of a sleeve 11 having interior threads for engagement with the threads upon collar 3.

In order that the flange 10 may be held close to the shoulder 9 an interiorly threaded washer 12 is mounted on the reduced threaded portion 8 of the box 4, there being sockets 13 within the exposed face of this washer for the reception of a suitable wrench whereby the washer may be screwed onto or unscrewed from the box. A set screw 14 is preferably arranged within the sleeve 11 so as to engage the threaded collar 3 and a ring 15 may be secured in any suitable manner around the box 4 close to the shoulder 9 so as to form a continuation of said shoulder. It is to be understood, however, that if preferred a flange integral with the box 4 may be substituted for the ring 15.

It is to be understood that the box 4 is to fit snugly within the hub of a wheel and is held in position therein by means of nut 7, independent rotation of the hub and box being prevented by ribs 16 such as ordinarily employed for this purpose. After the box has been secured in the hub the sleeve 11 is placed upon the reduced portion 8 with flange 10 bearing against shoulder 9. The ring or washer 12 is then screwed onto the reduced portion 8 and against the flange 10, thus holding the sleeve 11 against independent longitudinal movement but permitting it to rotate. After the parts have thus been assembled the box 4 is slipped onto spindle 2 and sleeve 11 is rotated so as to screw onto the collar 3. When the parts have been properly adjusted they can be locked by means of set screw 14, thus holding the sleeve 11 fixed relative to the axle and permitting the box 4 to rotate upon the spindle, the ring or washer 12 moving therewith.

It will be seen that a device such as herein described is practically dustproof and is advantageous because it is formed of few parts and can be readily assembled and taken apart. To facilitate lubrication a longitudinal groove 17 may be formed within the spindle.

What is claimed is:

The combination with an axle, a screw-threaded collar thereon and a tapered spindle; of a hub-box formed in a single piece and closed at one end, there being a tapered recess within the box for the reception of the spindle, one end of the box being reduced annularly and screw-threaded, said reduced portion having an annular shoulder or abutment at one end thereof, an interiorly screw-threaded sleeve having an inwardly directed flange, said reduced portion of the box being insertible into the sleeve with its abutment against the flange, an interiorly screwthreaded washer engaging the threaded portion of the box and disposed within the sleeve, said flange of the sleeve being positioned between the washer and the abutment, and constituting means for holding the box against longitudinal movement upon the spindle, the threads within the sleeve engaging the threads upon the collar, and means within the sleeve and engaging the collar to hold said sleeve and collar against independent rotation.

In testimony that I claim the foregoing as my own, I have hereto affixed my signature in the presence of two witnesses.

ROY T. DANIEL.

Witnesses:
 JAS. M. WALKER,
 HERBERT D. LAWSON.